United States Patent Office 3,248,364
Patented Apr. 26, 1966

3,248,364
POLYCARBONATES OF BISPHENOLS
Winston J. Jackson, Jr., and John R. Caldwell, Kingsport, Tenn., assignors to Eastman Kodak Company, Rochester, N.Y., a corporation of New Jersey
No Drawing. Filed Sept. 14, 1961, Ser. No. 137,971
6 Claims. (Cl. 260—47)

This invention relates to bisphenol polycarbonates and bisphenol intermediates for synthesis of such polycarbonates.

An object of the invention is to provide improved thermoplastic linear polycarbonate resins having exceptionally high heat-distortion temperatures and having fire-resistant properties. Another object is to provide bisphenol intermediates for synthesis of such polycarbonates.

Linear thermoplastic polycarbonates of suitably high molecular weight for useful applications have been produced by reaction of diacid chlorides with bisphenols by interfacial polycondensation process. The bisphenol is suspended in an alkaline aqueous phase which is intimately contacted with a water-immiscible organic solvent phase in which the diacid chloride is dissolved. As the polycondensation reaction proceeds at the water-solvent interface, the polycarbonate product is dissolved into the organic solvent. The alkali in the water phase acts as an acceptor for the acid by-product. Using this process, high-molecular weight bisphenol polycarbonates have been produced.

We have found that polycarbonates of bisphenols having the following general formula possess unique and unexpected properties:

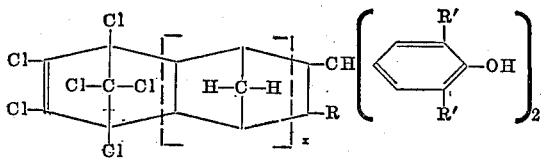

wherein $x=0$ or 1, R=hydrogen, chlorine, methyl, ethyl, propyl, butyl or phenyl, R'=hydrogen, chlorine, methyl, ethyl propyl or butyl.

The 4,4'-[(1,4,5,6,7,7-hexachloro-5-norbornen-2-yl) methylene]diphenols ($x=0$) are prepared as follows:

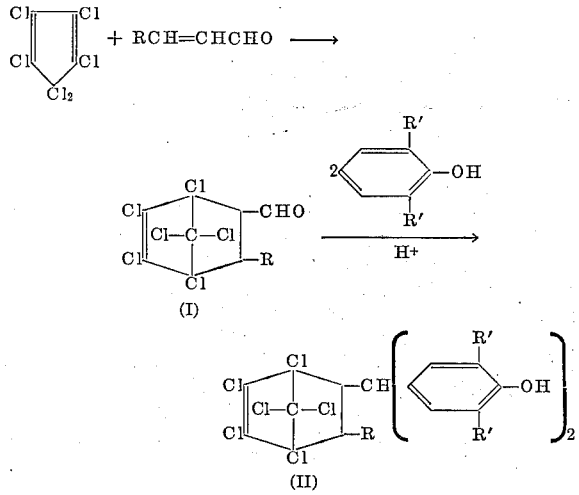

Hexachlorocyclopentadiene is heated with an α,β-unsaturated aldehyde to give the Diels-Alder adduct (I), and this compound is condensed with a phenol in an acidic medium to yield the bisphenol (II). Concentrated hydrochloric acid is preferred for this purpose, but other acids, such as sulfuric, toluene-sulfonic, or methionic can be used.

The 4,4'-[(5,6,7,8,9,9-hexachloro-1,2,3,4,4a,5,8,8a-octahydro - 1,4,5,8 - dimethanonaph-2-yl)methylene]diphenols ($x=1$) are prepared as follows:

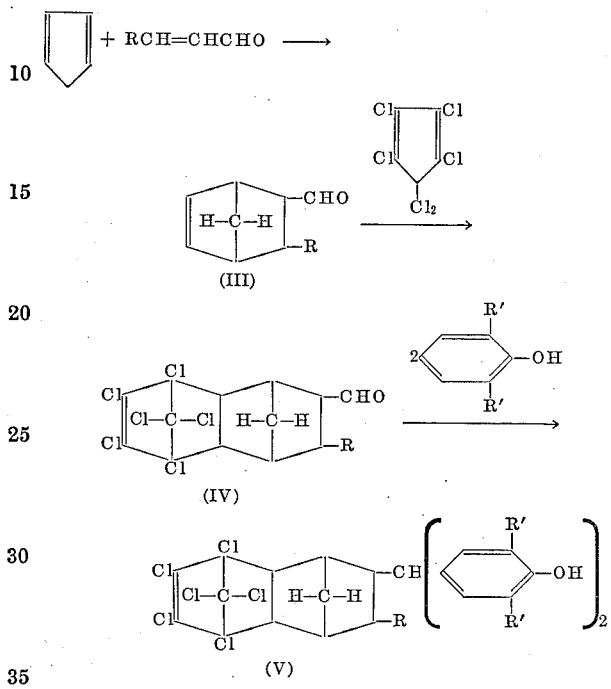

The first two steps involve Diels-Adler reactions. The last step is the condensation of a phenol with aldehyde (IV). The conditions are the same as those discussed for preparing bisphenol (II).

Polycarbonates of these bisphenols are prepared by known interfacial polycondensation procedures using phosgene or a diol bischloroformate as the diacid chloride. Co-polycarbonates may be made using a mixture of these diacid chlorides and/or a mixture of bisphenols. Detailed description of suitable procedures and typical examples of suitable diol bischloroformates appear in our copending application Serial No. 137,980, entitled "Bisphenol Polyesters," filed of even date herewith, and now abandoned.

Following are examples illustrating synthesis of the bisphenol intermediates and synthesis of typical polycarbonates from these bisphenols according to the invention.

*Example I*

1,4,5,6,7,7 - hexachloro-5-norbornene-2-carboxaldehyde was prepared according to the method of U.S. Patent 2,761,879 by heating 1.5 moles of hexachlorocyclopentadiene with 1.8 moles of acrolein on a steam bath for 60 hours. After sublimation, the aldehyde (0.17 mole) was dissolved in warm phenol (0.68 mole) containing 1 ml. of β-mercaptopropionic acid catalyst. The mixture was cooled to 30° C., and 150 ml. of concentrated HCl was slowly added to the stirred mixture. The reaction was exothermic. The temperature was held down to 35° C. by cooling with a water bath. The mixture was stirred for 3 hours and then allowed to stand overnight. The excess phenol was removed by stirring with hot water (70–80° C.) several times and decanting the water each time. The bisphenol product was recrystallized from benzene and then from toluene. The bisphenol melted at 135–145° C., and consisted of a mixture of the endo and exo isomers. Analysis indicated the empirical formula $C_{20}H_{14}Cl_6O_2$ for the bisphenol. The bisphenol is 4,4'-[(1,4,5,6,7,7 - hexachloro - 5 - norbornen-2-yl)methylene] diphenol.

*Example II*

A polycarbonate of the bisphenol product of Example I was prepared by adding 3.0 g. of phosgene to a stirred mixture containing 12.5 g. (0.025 mole) of the bisphenol, 4 g. of sodium hydroxide in 100 ml. of water, 50 ml. of methylene chloride, and 2 ml. of a solution containing one drop of tributylamine in 10 ml. of methylene chloride. The temperature were held at about 20° C. After the mixture had stirred for 1 hour, the methylene chloride layer was very viscous. It was neutralized with acetic acid, diluted with more methylene chloride, and thoroughly washed with water. The polymer was precipitated as a white fibrous material by slowly adding the methylene chloride solution to hexane. The polymer had an inherent viscosity of 1.1. A film of the polycarbonate cast from methylene chloride was self-extinguishing. There was no tendency for the polymer to melt and drip during this test, and the ash was firm. The film had the following properties: tensile strength 10,500 p.s.i., elongation 6.8%, elastic modulus $3.7 \times 10^5$ p.s.i., heat-distortion temperature 307° C., second-order transition temperature 297° C.

*Example III*

A co-polycarbonate was prepared using 0.012 mole of the bisphenol product of Example I and 0.012 mole of Bisphenol A, 4,4'-(isopropylidene)diphenol, in the process of Example II. The co-polycarbonate had an inherent viscosity of 0.86. A film of this polymer cast from methylene chloride solvent was self-extinguishing and when burned the ash was firm. The film had the following properties: tensile strength 11,100 p.s.i., elongation 10.2%, modulus $3.6 \times 10^5$ p.s.i., heat-distortion temperature 270° C.

*Example IV*

1,4,5,6,7,7-hexachloro-3-methyl-5-norbornene - 2 - carboxaldehyde was prepared using crotonaldehyde instead of acrolein in the procedure of Example I. A bisphenol was prepared from this aldehyde by the method of Example I. The bisphenol was 4,4'-[(1,4,5,6,7,7-hexachloro - 3 - methyl-5-norbornen-2-yl]methylene)diphenol. It melted at 120–135° C. and consisted of a mixture of endo and exo isomers. Analysis showed the empirical formula to be $$C_{21}H_{16}Cl_6O_2$$

correct for 4,4'-[(1,4,5,6,7,7-hexachloro-3-methyl-5-norbornen-2-yl)methylene]diphenol.

*Example V*

A polycarbonate was prepared from the bisphenol of Example IV according to the procedure of Example II. The polymer had an inherent viscosity of 0.72. A film cast from methylene chloride was self-extinguishing and the ash was firm. The film had the following properties: tensile strength 11,400 p.s.i., elongation 8.7%, elastic modulus $3.8 \times 10^5$ p.s.i., heat-distortion temperature 300° C.

*Example VI*

5-norbornene-2-carboxaldehyde was prepared by slowly heating 9 moles of acrolein and 4.5 moles of dicyclopentadiene to 200° C. in an autoclave. The mixture was then immediately cooled. The product distilled at 72–75° C./23 mm. and consisted of a mixture containing equal amounts of the endo and exo isomers. This aldehyde (0.8 mole) and hexachlorocyclopentadiene (0.9 mole) were then heated on a steam bath for 3 days. The solid product was recrystallized from cyclohexane. The 5,6,7,8,9,9-hexachloro-1,2,3,4,4a,5,8,8a - octahydro - 1,4, 5,8-dimethanonaphthalene-2 - carboxaldehyde melted at 147–157° C. It consisted of a mixture of endo and exo isomers. Analysis showed the empirical formula to be $C_{13}H_{10}Cl_6O$. The bisphenol, 4,4' - [(5,6,7,8,9,9 - hexachloro-1,2,3,4,4a,5,8,8a-octahydro - 1,4,5,8 - dimethanonaph-2-yl)methylene]diphenol, was prepared from the aldehyde by the method of Example I. It consisted of a mixture of endo and exo isomers. Analysis showed the empirical formula to be $C_{25}H_{20}Cl_6O_2$.

*Example VII*

A polycarbonate was prepared using the bisphenol of Example VI in the procedure of Example II. The polymer had an inherent viscosity of 0.68. A film cast from methylene chloride was self-extinguishing and the ash was firm. The film had the following properties: tensile strength 10,700 p.s.i., elongation 5.9%, elastic modulus $3.9 \times 10^5$ p.s.i., heat distortion temperature above 310° C.

Because the polycarbonates of the invention are fire-retardant, are soluble in chlorinated organic solvents, and possess unusually high heat-distortion temperatures as well as good tensile properties, they are useful in a number of fiber, film, coating, and molded-object manufactures. For instance, fibers of these resins are useful for spinning fire-retardant fabrics. Films useful for motion picture film backing can be made from these polycarbonates by conventional methods. These fire-retardant polymers possess good dielectric properties making them useful as insulating material.

Bisphenol polycarbonates may be described as polyesters consisting of recurring units which are polycondensation residues of bisphenols and diacid chlorides.

The novel bisphenols described are useful for making a large number of useful polycarbonate resins by interfacial polycondensation procedures like those illustrated in the specific examples above. Included in the invention are all such polycarbonate resins in which one of the novel bisphenols occurs as a recurring unit having this general formula:

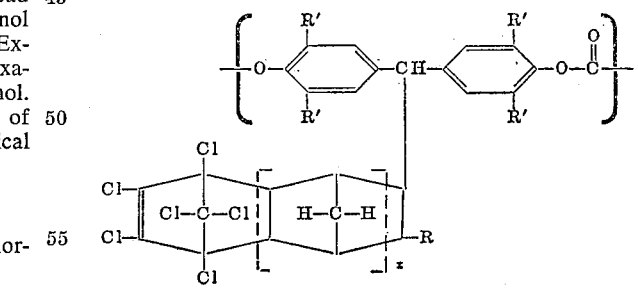

wherein x, R', and R are the same as described above.

Linear polycarbonates containing this unit may also contain other units recurring in ordered or random arrangement depending upon the diacid chloride monomers and other bisphenol monomers used in the polycondensation reaction. Useful polycarbonate resins may be prepared by condensing this bisphenol with one or a mixture of the many diacid chlorides which are known to polymerize with bisphenols in interfacial polycondensation reactions, such as phosgene and the bischloroformates of many aliphatic, cycloaliphatic and aromatic diols. Mixed copolycarbonates containing condensation residues of other bisphenols as well as residues of the novel bisphenols may be prepared by condensing a diacid chloride with a mixture of bisphenols by the interfacial method.

In the foregoing detailed description, specific examples are given to illustrate the invention and should not be construed to limit the scope of the invention as defined in the following claims:

We claim:
1. A linear thermoplastic polycarbonate consisting essentially of recurring units having the general formula:

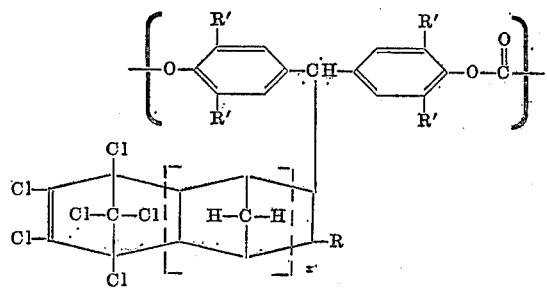

wherein $x=0$ or 1, R=hydrogen, chlorine, methyl ethyl, propyl, butyl or phenyl, and R'=hydrogen, chlorine, methyl, ethyl propyl or butyl.

2. A polycarbonate as defined by claim 1 wherein $x=0$.

3. A polycarbonate as defined by claim 1 wherein $x=0$ and R=methyl.

4. A polycarbonate as defined by claim 1 wherein $x=1$.

5. A bisphenol having the following general formula:

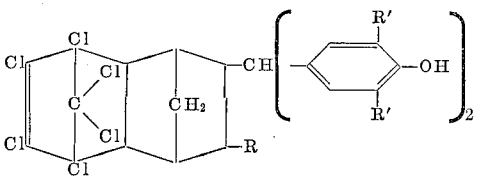

wherein R represents a member selected from the group consisting of a hydrogen atom, a chlorine atom, a phenyl radical and alkyl radicals having from 1 to 4 carbon atoms, and each R' represents a member selected from the group consisting of a hydrogen atom, a chlorine atom and alkyl radicals having from 1 to 4 carbon atoms.

6. 4,4' - [(5,6,7,8,9,9 - hexachloro - 1,2,3,4,4a,5,8,8a-octahydro - 1,4,5,8 - dimethanonaph - 2 - yl)methylene] diphenol.

References Cited by the Examiner
UNITED STATES PATENTS

| | | | |
|---|---|---|---|
| 2,761,879 | 9/1956 | Soloway | 260—598 |
| 2,970,151 | 1/1961 | Beaver | 260—619 |
| 2,991,273 | 7/1961 | Hechelhammer et al. | 260—47 |

SAMUEL H. BLECH, *Primary Examiner.*
LOUISE P. QUAST, MURRAY TILLMAN, *Examiners.*